(12) United States Patent
Rao et al.

(10) Patent No.: US 8,041,703 B2
(45) Date of Patent: Oct. 18, 2011

(54) AGENT FOR IDENTIFYING DOMAINS WITH CONTENT ARRANGED FOR DISPLAY BY A MOBILE DEVICE

(75) Inventors: Sudhir Kumar Rama Rao, Bangalore (IN); Bangalore Subbaramaiah Prabhakar, Bangalore (IN); Siddharth Seth, Bangalore (IN); Sundaramoorthy Murugesan, Tamil Nadu (IN); Ashima Gupta, Koramangala (IN)

(73) Assignee: Yahoo! Inc., Sunnyvale, CA (US)

( * ) Notice: Subject to any disclaimer, the term of this patent is extended or adjusted under 35 U.S.C. 154(b) by 614 days.

(21) Appl. No.: 11/564,756

(22) Filed: Nov. 29, 2006

(65) Prior Publication Data
US 2008/0033998 A1 Feb. 7, 2008

(30) Foreign Application Priority Data
Aug. 3, 2006 (IN) .............................. 778/KOL/2006

(51) Int. Cl.
*G06F 17/30* (2006.01)
(52) U.S. Cl. ........................................................ 707/709
(58) Field of Classification Search .............. 707/3, 709, 707/999.003
See application file for complete search history.

(56) References Cited

U.S. PATENT DOCUMENTS

| | | | | |
|---|---|---|---|---|
| 6,763,388 B1* | 7/2004 | Tsimelzon | .................... | 709/228 |
| 7,096,030 B2* | 8/2006 | Huomo | ....................... | 455/456.3 |
| 2002/0105539 A1* | 8/2002 | Gamzon et al. | ............... | 345/738 |
| 2004/0205114 A1* | 10/2004 | Kinoshita | ..................... | 709/202 |
| 2006/0212451 A1* | 9/2006 | Serdy et al. | ..................... | 707/10 |
| 2007/0061245 A1* | 3/2007 | Ramer et al. | .................... | 705/37 |
| 2007/0275705 A1* | 11/2007 | Lau et al. | .................... | 455/414.1 |
| 2008/0045194 A1* | 2/2008 | Gilhuly et al. | ............. | 455/414.2 |
| 2008/0072139 A1* | 3/2008 | Salinas et al. | ................. | 715/238 |
| 2009/0044098 A1* | 2/2009 | Wyler et al. | .................... | 715/234 |

OTHER PUBLICATIONS

"User agent." *"Wikipedia, The Free Encyclopedia"* (2007) (accessed Feb. 21, 2007), 21:14 UTC, Wikimedia Foundation, Inc. <http://en.wikipedia.org/w/index.php?title=User_agent&oldid=109646925>.

* cited by examiner

*Primary Examiner* — Kimberly Lovel
*Assistant Examiner* — Mohammed R Uddin
(74) *Attorney, Agent, or Firm* — Frommer Lawrence & Haug LLP; Jamie L. Wiegand

(57) ABSTRACT

A system, apparatus, and method are disclosed for providing a single source for searchable content by mobile devices. Mobile user agents crawl host sites to determine whether there is content that may be viewed by any of the mobile user agents. If files are identified as viewable for a given mobile user agent, the site is tagged as crawlable. A best mobile user agent may also be identified for that site, based on number of files viewable, response time, file mobileness, or the like. The sites may be discovered by instrumentation of URLs with mobile device keywords, performing a backlink analysis to discover interlinking of mobile device related sites, exploring URLs of a known host name for potential starting points for mobile device sites, or employing a list of known popular conventional sites with a mobile user agent for possible redirections to a potential mobile device web site.

19 Claims, 5 Drawing Sheets

AGENT FOR IDENTIFYING DOMAINS WITH CONTENT ARRANGED FOR DISPLAY BY A MOBILE DEVICE

CROSS-REFERENCE TO RELATED APPLICATIONS

This application claims the benefit of Indian Application Serial No. 778/KOL/2006 filed on Aug. 3, 2006, which is hereby incorporated by reference.

BACKGROUND OF THE INVENTION

This invention relates generally to network communications, and more particularly but not exclusively, to performing discovery and analysis of mobile web sites, and identifying a mobile user-agent useable for crawling the discovered mobile web sites.

In today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, or the like.

However, there are currently a large variety of mobile devices, many with different features, and capabilities. Unfortunately, many of today's web sites are not designed to accommodate the variety of mobile devices. Thus, many mobile devices may not be able to view most of the web sites. Moreover, even while a web site may be organized for viewing with a particular type of mobile device, they may not be well connected with other web sites similarly configured for that type of mobile device. Worse yet, naming conventions used to identify content that is viewable by a mobile device may be inconsistent between web sites. Thus, the mobile device user may be unable to readily search for and locate information that may be viewable using their mobile device. Accordingly, there is a need in the industry to provide mobile device users with an improved mechanism for locating web content viewable by their mobile device. Therefore, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
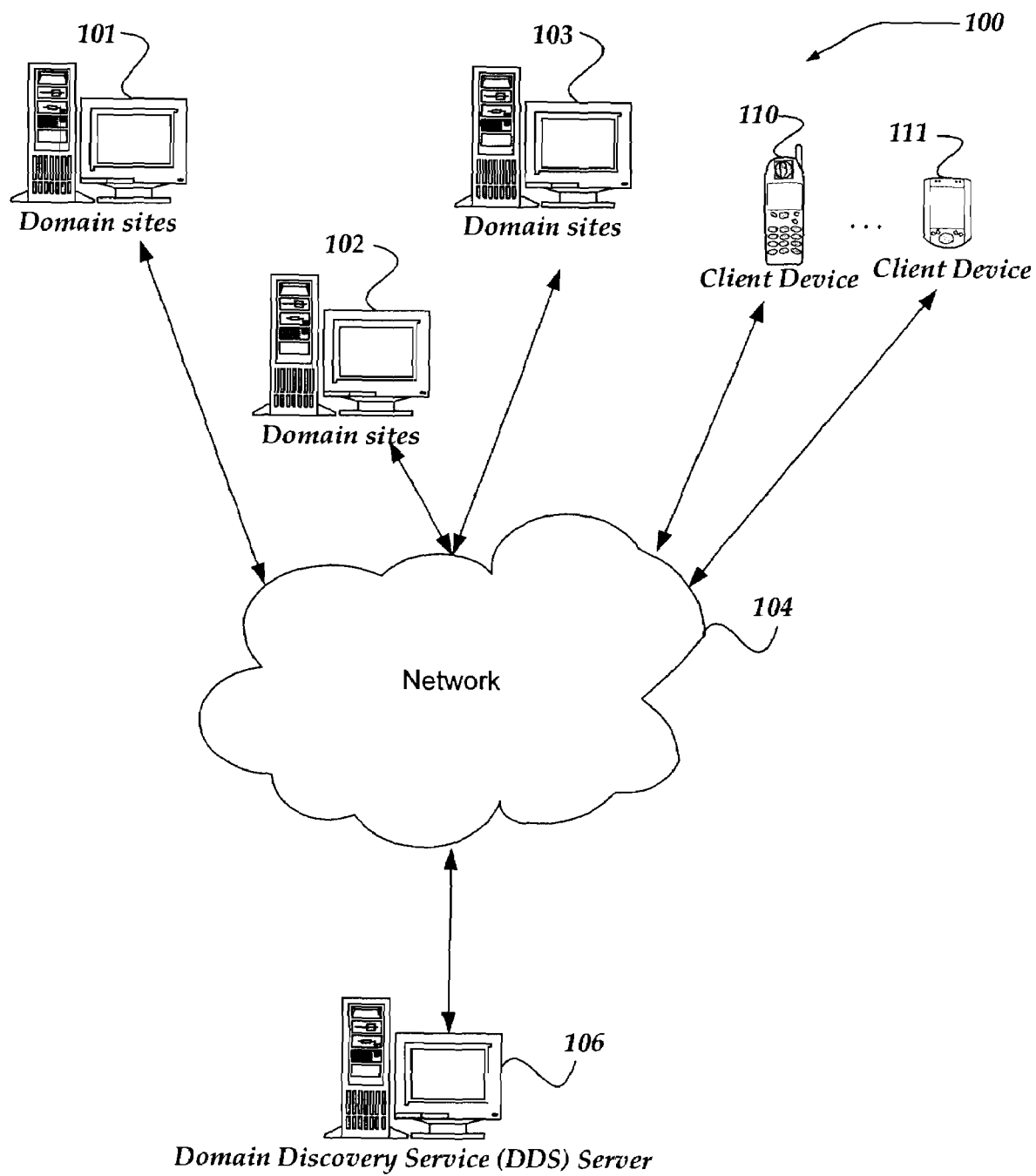
FIG. 1 shows a functional block diagram illustrating one embodiment of an environment for performing domain discovery.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The term "mobile web" generally refers to a collection of devices, data, and/or other resources that are accessible over a network according to one or more protocols, formats, syntax, and/or other conventions that are intended for use with specialized or otherwise limited capability devices, such as mobile phones, personal digital assistants (PDAs), palm-top computers, portable music devices, and the like. Mobile web protocols include, but are not limited to, the wireless application protocol (WAP). Such conventions include, but are not limited to, wireless markup language (WML) and extensible hypertext markup language (XHTML). The terms "mobile web page," "mobile web data," and "mobile content" generally refer to a document, file, application, service, and/or other data that conforms to mobile web conventions and is generally accessible with a limited capability device running a limited capability application such as a micro browser.

Example micro browsers include Explorer Micro™ from Microsoft Corporation and the Fusion WebPilot™ from DSPOS, Inc.

The term "conventional web" generally refers to a collection of devices, data, and/or other resources that are accessible over a network according to one or more protocols, formats, syntax, and/or other conventions that are intended for use with general purpose devices, such as personal computers, laptop computers, workstations, servers, mini computers, mainframes, and the like. Conventional web protocols include, but are not limited to, the hypertext transfer protocol (HTTP). Such conventions include, but are not limited to, hypertext markup language (HTML) and extensible markup language (XML). The terms "conventional web page" and "general web data" generally refer to a document, file, application, service, and/or other data that conforms to conventional web conventions and is generally accessible with a general purpose computing device running a full capability application such as a general purpose browser. Example general purpose browsers include Internet Explorer™ from Microsoft Corporation, Netscape™ from Netscape Communications Corp., and Firefox™ from the Mozilla Foundation. Conventional web pages are generally indexed by search engines that are able to access conventional web pages, but may have limited, or no ability to access mobile web pages. An example search engine is Yahoo Search™ by Yahoo, Inc. The term "conventional web host" generally refers to a host associated with a network domain that includes conventional web pages.

Briefly stated the invention is directed towards a system, apparatus, and method for automatically managing domain discovery of mobile web sites and providing a single source for searchable content by mobile devices. Various mobile user agents for different mobile devices are identified and used to crawl host sites over a network. When a previously un-searched host site is located, the various mobile user agents are used to determine whether there is content at the site that may be considered as mobile viewable by any of the mobile user agents. A site may be considered to be mobile viewable based on a variety of mobileness criteria, including, for example, content type of documents at the site, use of document type definitions (DTDs), validity of tags in a document, use of negative tags, document sizes, whether content is returned, or the like. In any event, if a configurable threshold number of documents are identified as viewable for a given mobile user agent, the site is tagged as crawlable for that mobile user agent. Where a site is determined to be crawlable by multiple mobile user agents, each mobile user agent may also be identified. In addition, a best mobile user agent is also identified for that site, based on various factors, including number of files viewable, response time to view files, file mobileness, and the like.

Host sites, domain sites, web sites, and the like, to search for mobile device capable content are obtained using a variety of mechanisms. In one embodiment, known hostname URLs are modified using mobile related keywords. The modified URLs are used with a given mobile user agent to attempt to discover other potential mobile device capable sites. In another embodiment, a search is performed to identify hosts that include links to a known useable mobile host. The identified hosts, along with content, anchor text, and the like, may be analyzed to obtain additional potential mobile device related sites. By performing this link analysis, site interlinking that is useable with mobile devices may be obtained. Additional mobile device sites may be obtained by exploring a conventional host site's URLs. URLs having mobile device keywords may be further examined to determine if the URL is useable by a mobile device. Another approach for obtaining additional potential mobile device sites, examines a list of known popular conventional web sites. If an attempt to access one of these popular web sites with a mobile user agent and mobile header information is redirected to a mobile web site, that redirection is added as a potential mobile device site.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes domain sites 101-103, client devices 110-111, network 104, and Domain Discovery Service (DDS) Server 106. Network 104 is in communication with and enables communication between each of domain sites 101-103, client devices 110-111, and DDS server 106.

Client devices 110-111 may include virtually any computing device capable of receiving and sending a message over a network, such as network 104, to and from another computing device, such as domain sites 101-103, each other, and the like. The set of such devices generally includes mobile devices that are usually considered more specialized devices with limited capabilities and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. However, the set of such devices may also include devices that are usually considered more general purpose devices and typically connect using a wired communications medium at one or more fixed location such as laptop computers and the like. Similarly, client devices 110-111 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 110-111 may include a user interface that enables a user to control settings, and to instruct the client device to perform operations. Each client device also includes a client user agent that enables the client device to send and receive messages to/from another computing device employing the same or a different communication means, including, but not limited to SMS, MMS, IM, internet relay chat (IRC), Mardam-Bey's internet relay chat (mIRC), Jabber, email, and the like.

Client devices 110-111 may be further configured with a browser application that is configured to receive and to send content in a variety of forms, including, but not limited to markup pages, web-based messages, audio files, graphical files, file downloads, applets, scripts, and the like. The browser application may be configured to receive and display graphics, text, multimedia, and the like, employing virtually any mobile markup based language or Wireless Application Protocol (WAP), including, but not limited to a Handheld Device Markup Language (HDML), such as Wireless Markup Language (WML), WMLScript, JavaScript, Standard Generalized Markup Language (SGML), HyperText Markup Language (HTML), Extensible Markup Language (XML), EXtensible HTML (XHTML), or the like. The browser application is another example, of a user agent.

Because each client device within client devices 110-111 may vary in size, shape, and capabilities, client devices 110-111 may also be configured to provide device profile information about its capabilities including whether the client device is capable of receiving particular types of audio files, graphical files, web-based files, and the like. Client devices 110-111 may also provide device profile information that may include an available application on the client device, version information, and other information about the device. In one embodiment, such information may include information such as the client device's network protocol capabilities. Various client applications may employ different network protocols. Thus, in one embodiment, a mobile device profile can also be used to obtain a mobile client's user agent capabilities. For example, a user agent capability may be obtained based, in part, on information in a standardized user agent profile, such as that defined by the User Agent Profile Specification available from the Wireless Application Protocol Forum, Ltd., Composite Capability/Preference Profiles (CC/PP), defined by the World Wide Web Consortium, or the like.

Client devices 110-111 may also provide an identifier. The identifier may employ any of a variety of mechanisms, including a device model number, a carrier identifier, a mobile identification number (MIN), and the like. The MIN is often a telephone number, a Mobile Subscriber Integrated Services Digital Network (MS-ISDN), an electronic serial number (ESN), or other device identifier. In one embodiment, the identifier, and the device profile information is sent with each message to another computing device. However, the invention is not so limited, and the identifier and device profile information may be sent based on a request for such information, an event, or so forth.

Network 104 is configured to couple one computing device to another computing device to enable them to communicate. Network 104 is enabled to employ any form of medium for communicating information from one electronic device to another. Also, network 104 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between client devices 110-111, domain sites 101-103, and/or DDS server 106. Network 104 is constructed for use with various communication protocols including wireless application protocol (WAP), transmission control protocol/internet protocol (TCP/IP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Domain servers 101-103 include virtually any network device that may be configured to provide content over a network. In one embodiment, domain servers 101-103 are configured to operate as a web site server. Thus, in one embodiment, domain servers 101-103 may provide access to content using a domain name. Moreover, such content may typically be configured for viewing using a variety of user agents, including web browsers, or the like. Some of the content may be configured to be specifically viewable by mobile user agents, while other content may be un-viewable by mobile user agents. In one embodiment, some of the content may be viewable by particular mobile user agents, while un-viewable by another mobile user agent. In one embodiment, domain servers 101-103 may organize at least some of its content based on a host name.

Domain servers 101-103 are not limited to web servers, and may also operate a messaging server, a File Transfer Protocol (FTP) server, a database server, application server, and the like. Devices that may operate as domain servers 101-103 include personal computers desktop computers, multiprocessor systems, microprocessor-based or programmable consumer electronics, network PCs, servers, and the like.

One embodiment of DDS server 106 is described in more detail below in conjunction with FIGS. 2-3. Briefly, however, DDS server 106 includes virtually any network device that may be configured to discover and provide a searchable list of mobile web sites, along with an identification of a mobile user agent that may be employed to access the mobile web site. DDS server 106 may employ a web crawler to perform to locate at least some potentially useable mobile web sites. Moreover, in one embodiment, DDS server 106 may perform at least some of its actions using a process substantially similar to that described below in conjunction with FIGS. 4-5.

Although DDS server 106 is illustrated as a single network device, the invention is not so limited. For example, DDS server 106 may be implemented using several network devices, without departing from the scope of the invention. Devices that may operate as DDS server 106 include personal computers desktop computers, multiprocessor systems, microprocessor-based or programmable consumer electronics, network PCs, servers, and the like.

Illustrative Network Device

Figure 2:
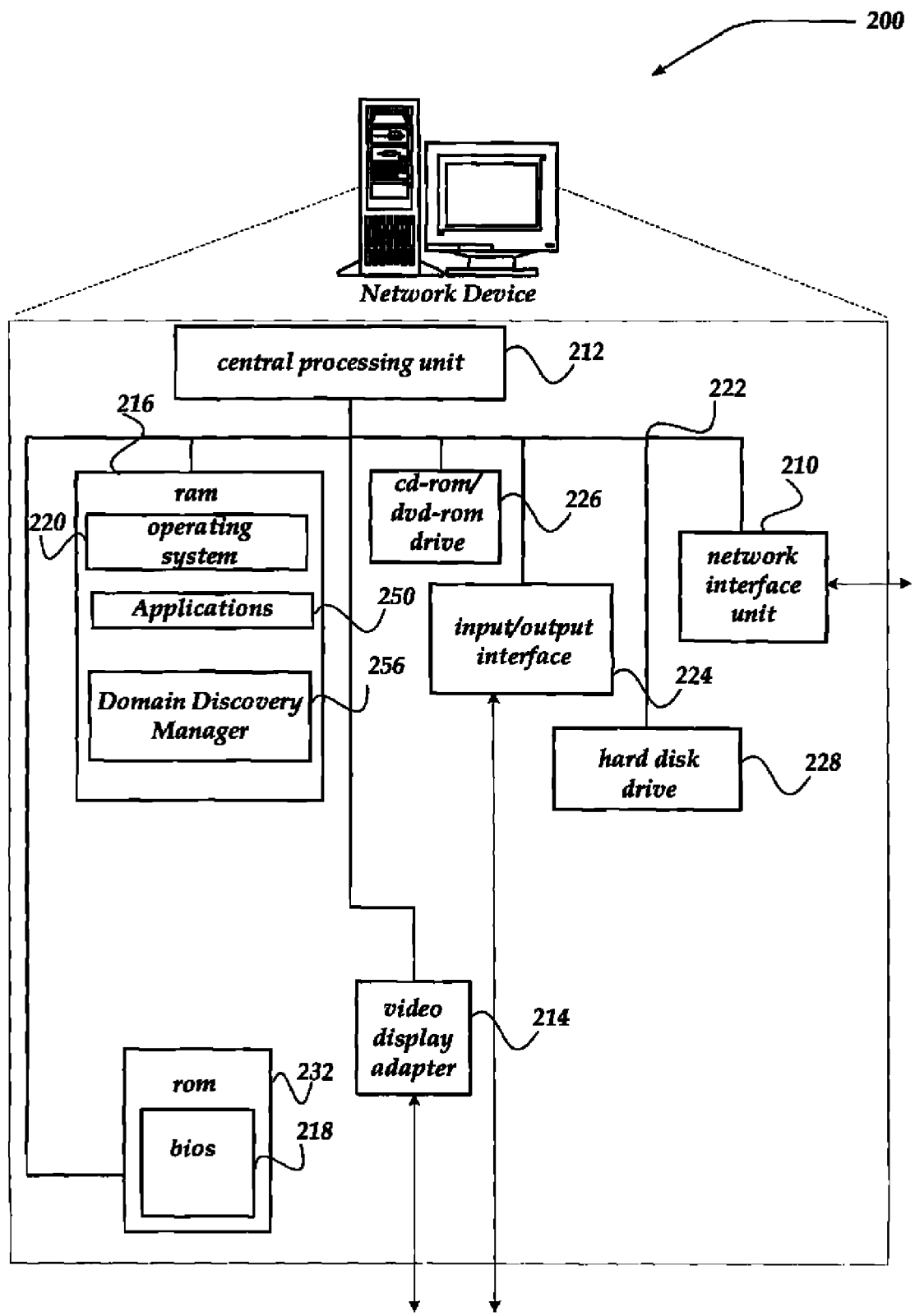
FIG. 2 shows one embodiment of a server device that may be included in a system implementing the invention.

FIG. 2 shows one embodiment of a network device, according to one embodiment of the invention. Network device 200 may include many more or less components than those shown. For example, network device 200 may operate as a network appliance without a display screen. The components shown, however, are sufficient to disclose an illustrative embodiment for practicing the invention. Network device 200 may, for example, represent DDS server 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 is utilized by network device 200 to store, among other things, application programs, databases, or the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, security programs, web servers, web crawlers, and so forth. Mass storage may further include applications such Domain Discovery Manager (DDM) 256.

DDM 256 is described in more detail below in conjunction with FIG. 3. Briefly, however, DDM 256 is configured to enable automatic discovery of domains, host site, and other web sites that are viewable using a mobile device. In addition, DDM 256 may include with a searchable list of the domains, information identifying at least one mobile user agent that may be used to view content at the domain. Although DDM 256 is illustrated as a single component, the invention is not so limited. DDM 256 may, in another embodiment, be implemented as distinct components, as illustrated in FIG. 3, and/or across one or more network devices, such as network device 300. Moreover, DDM 256 may employ processes such as described below in conjunction with FIGS. 4-5 to perform at least some of its actions.

Figure 3:
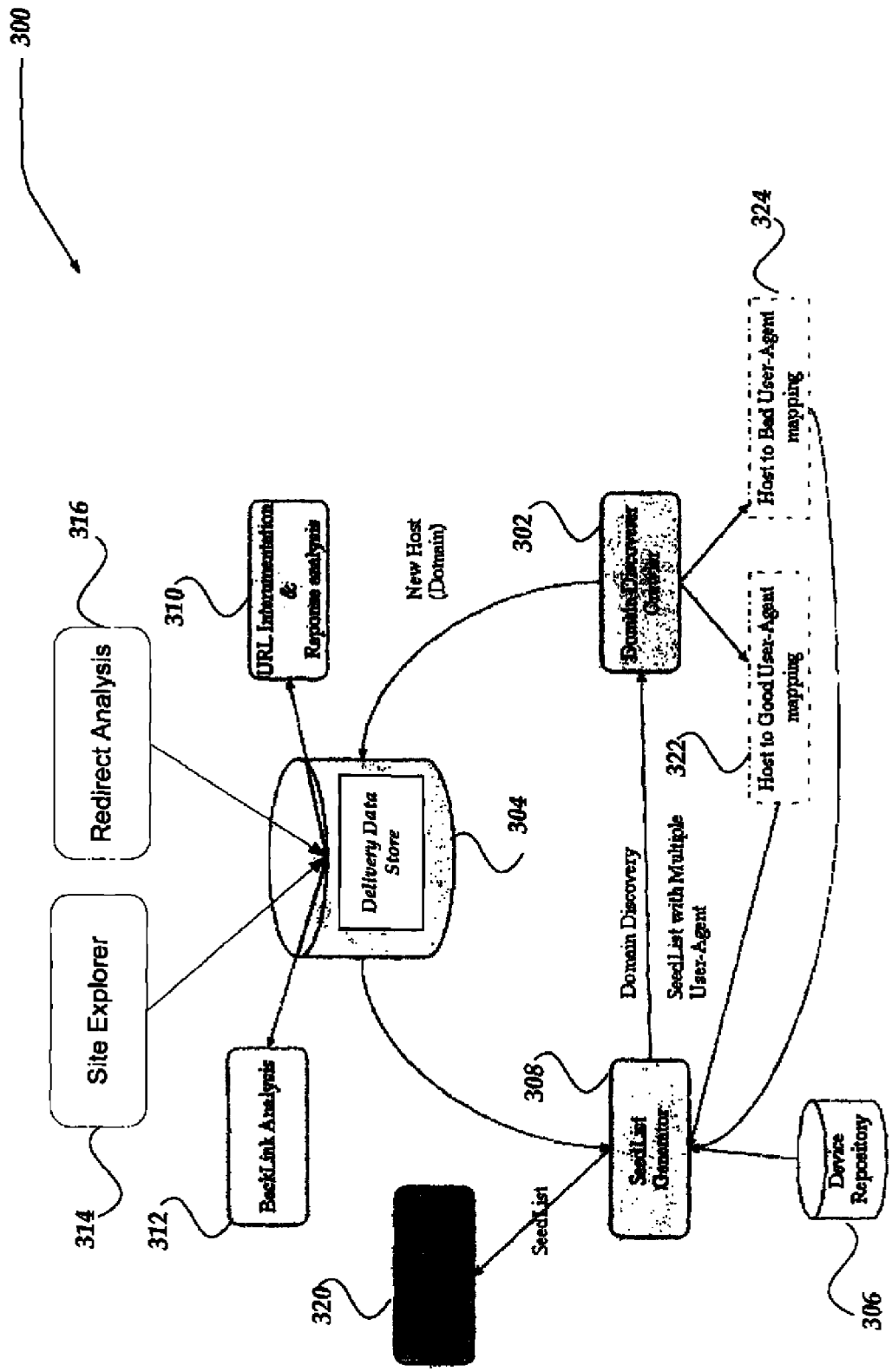
FIG. 3 shows a functional block diagram illustrating one embodiment of components for use in performing domain discovery.

FIG. 3 shows a functional block diagram illustrating one embodiment of components for use in performing domain discovery. Not all of the components shown may be required to practice the invention, and variations in the arrangement and type of the components may be made without departing from the spirit of the invention.

As mentioned above, system 300 components of FIG. 3 may be distributed across multiple network devices, or reside within a single network component, such as DDS server 106 of FIG. 1.

As shown, system 300 includes domain discoverer crawler 302, delivery data store 304, device repository 306, seedlist generator 308, URL instrumentation & response analysis (URL Instrumentation) 310, backlink analysis 312, site explorer 314, redirect analysis 316, and primary crawlers 320.

Domain discoverer crawler 302 is configured to receive a list of potential mobile host sites and a list of mobile user agents and to provide as at least one output, mobile searchable domain sites, host sites, or other web sites. Domain discoverer crawler 302 may also provide for each of the mobile searchable sites at least one mobile user agent useable for the mobile searchable site. In one embodiment, domain discoverer crawler 302 may also provide a best mobile user agent for a mobile site, based on a variety of criteria, including, for example, a number of documents viewable by the mobile user agent, a response time for retrieving and/or viewing documents, data format mobileness for the mobile user agent, or the like. In one embodiment, the response time may be an average response time, a median response time, or the like. In one embodiment the data format mobileness may be determined based on a variety of satisfied criteria for a given mobile user agent, including such as content types for the document, types of documents, validity of tags associated with documents, negative tags associated with documents, document sizes, or the like, for the mobile user agent. Moreover, in one embodiment, domain discoverer crawler 302 may also provide a list of host sites to good user-agent mapping 322, a list of host to bad user-agent mapping 324, or the like. In one embodiment, domain discoverer crawler 302 may provide the results of its discovery analysis to delivery database 304. Delivery database 304 need not be implemented as a database, and may be implemented using any of a variety of other mechanisms, including, for example, folders, scripts, spreadsheets, or the like. In addition, domain discoverer crawler 302 may employ a process such as described below in conjunction with FIG. 4 to perform at least some of its actions.

In one embodiment, list of host sites to good user-agent mapping 322, a list of host sites to bad user-agent mapping 324 may be provided to seedlist generator 308 which may employ the lists, along with information from delivery database 304 to provide a list of mobile searchable sites to primary crawlers 320 for use by an end-user, or other services in enabling mobile searches to be performed. Briefly, host sites to good user-agent mapping 322 may include host sites that are mobile searchable mapped to associated mobile user agents that enable the mobile viewing of the host site's contents. Similarly, host sites to bad user-agent mapping 324 may include a mapping listing of host sites that are not mobile searchable by either any mobile user-agent, or by a specified mobile user agent.

Seedlist generator 308 may also employ delivery database 304, along with device repository 306 to generate a seed list of potential mobile device searchable sites, including domain sites, host sites, web sites, or the like, along with a list of mobile user agents to test the sites against.

Seedlist generator 308 may obtain the list of mobile user agents from device repository 306, which is configured to store a list of various mobile user agents. Such mobile user agents may include a variety of browsers, or other mobile client applications. In one embodiment, the mobile user agents may be categorized based on a capability. For example, some mobile user agents may be classified as high end user agents, because they may be associated with client functions considered to require complexity, high bandwidth, or the like. Such high end mobile user agents may include, for example, those that provide support for XHTML, WAP 2.0+, complex audio/video data formats, complex image formats, or the like. A low end mobile user agent may, for example, include those mobile user agents that may require less complexity, such as, WML (WAP 1.2), limited or no audio/video/image formats, or the like.

Primary crawlers 320 include virtually any network crawler application useable to crawl discovered mobile sites and search enable the crawled data to provide network search results. In one embodiment primary crawlers 320 may receive mobile searchable site information, along with associated mobile user agent information, and index the information for an end-user, or other service.

URL instrumentation 310, backlink analysis 312, site explorer 314, and redirect analysis 316, are each described in more detail below. Briefly, however, each of these components is configured to provide additional potential sites that may be provided to domain discoverer crawler 302 to determine whether they are mobile sites and to further discover new hosts and domains useable for mobile devices. URL instrumentation 310 provides potential mobile sites based on creating potentially existing URLs from known host site names. Backlink analysis 312 provides potential sites based on searching results of other searches for relationships to potential hosts that may include potential mobile content. Site explorer 314 provides potential mobile sites based on an analysis of keywords for mobile content and URLs of sites crawled by a known web crawler. Redirect analysis 316 provides potential mobile sites by accessing popular conventional (non-mobile) web sites using a mobile user agent and mobile header information, and by inspecting the URL for mobile content keywords if redirected. Such mobile header information may include, for example, various HTTP request headers which provide specific information about a requesting mobile device, including for example, its capability, mobile user agent, accept header information, or the like.

Figure 4:
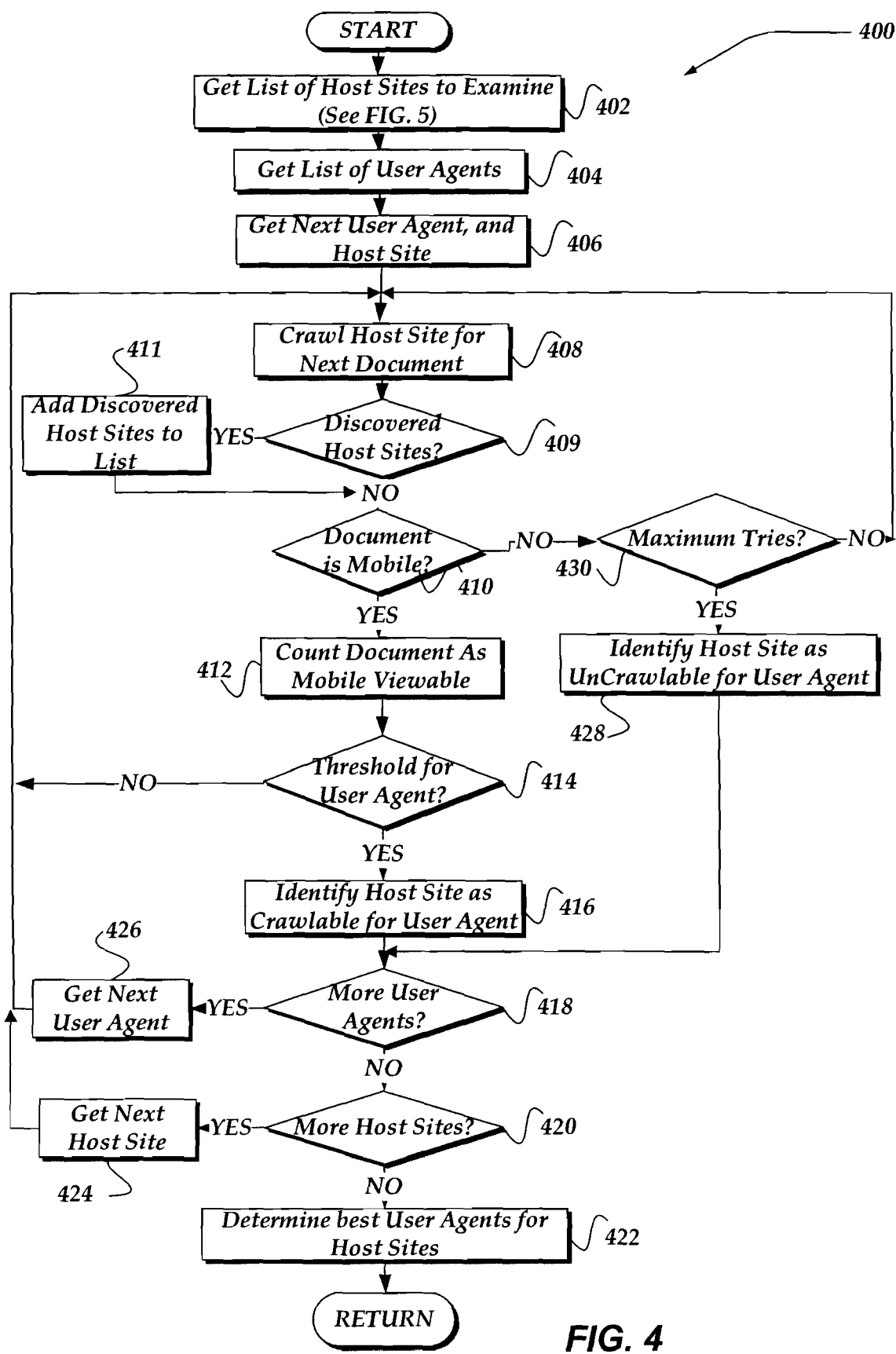
FIG. 4 illustrates a logical flow diagram generally showing one embodiment of an overview process for performing mobile web site domain discovery.

FIG. 4 illustrates a logical flow diagram generally showing one embodiment of an overview process for perform mobile web site domain discovery. Process 400 of FIG. 4 may be implemented within one or more network devices, such as DDS server 106 of FIG. 1.

Process 400 begins, after a start block, at block 402, where a list of potential mobile host sites, web sites, or the like, is obtained for discovery. One embodiment of block 402 is described in more detail below in conjunction with FIG. 5.

Process 400 continues next to block 404, where a list of mobile user agents is obtained. In one embodiment, the list may include high-end mobile user agents. In another embodiment, the list may include a mix of high-end and low-end mobile user agents. In one embodiment, the number of mobile user agents may be limited to virtually any number of mobile user agents. For example, in one embodiment, the number of mobile user agents to be used in process 400 may be set to between 4 and 4000. However, it is clear that any number and/or type of mobile user agents may be used, without departing from the scope of the invention.

Processing flows next to block 406, where a mobile user agent and host site (or site) is selected from the lists. Processing next flows to block 408, where the selected mobile user agent is employed to attempt to access content as the selected site is crawled for links. Processing then flows to decision block 409, where a determination is made whether, based on the crawling, new host sites are discovered. Discovery may arise, for example, because the crawler discovered additional links that may be potentially mobile host sites. Thus, if new host sites are discovered, processing flows to block 411 where the discovered new host sites may be added to the list of host sites. In this manner, the new host sites may be also be examined. Processing then flows to decision block 410. If no new host sites are discovered in block 408, processing also flows to decision block 410.

As a link is obtained within the site or a different site of the same domain or even within a different domain during block 408, a determination is made, at decision block 410, whether the associated link is to content (a document, or web page, or the like) that is mobile viewable by the selected mobile user agent. A document may be considered to be viewable or compatible with the selected mobile user agent based on several criteria, including whether the site can be automatically crawled and indexed using, in part, the selected mobile user agent. In one embodiment, a successful retrieval of a document, or other content, may establish the content to be mobile viewable. Successful retrieval may be indicated, in one embodiment, by not receiving an error message when an attempt to access the content is made by the selected mobile user agent. Moreover, successful retrieval may, in one embodiment, be determined based on the retrieved content being valid content, as opposed, for example, to a page or other content that indicates an error. In one embodiment, when a document is obtained, a determination is also made as to the mobileness of the document, based on a content-type of the document; DTDs for which the document may be pointing to; validity of tags in the document for mobile viewing, such as <wml> tags or the like; negative tags for mobile viewing, such as <frame>, or the like; document size, or the like. Moreover, a negative tag may be virtually any tag in the document that may hinder viewing the document from a given mobile user agent. Similarly, a valid tag in the document may be virtually any tag that is directed towards use by a mobile user agent. In one embodiment, if a document size is greater than some value, it may be considered to be unfriendly to the mobile user agent. For example, in one embodiment, documents whose size is greater than 10 KB may be considered to be unfriendly to the mobile user agent, although virtually any size may be used as criteria for determining mobileness of the documents. In any event, if the documents are determined to be un-viewable, or unfriendly to the mobile user agent, then the process flows to decision block 430; otherwise, processing flows to block 412.

At decision block 430, a determination is made whether for the selected mobile user agent a maximum number of tries for documents have been attempted. If not, then processing loops back to block 408 to continue crawling the site with the selected mobile user agent. Otherwise, if the maximum number of tries has been attempted without successfully retrieving the threshold number of documents, then processing flows to block 428, where the host site may be identified as un-crawlable for the selected mobile user agent. Discovery may then be terminated for the selected mobile user agent, and processing flows to decision block 418 to determine whether there are any more mobile user agents to use for the selected site.

At block 412, the viewable document may be counted for the selected mobile user agent. Processing next flows to decision block 414, where a determination is made whether a configurable threshold number of mobile viewable documents on the selected host site for the selected mobile user agent is reached. If so, processing flows to block 416; otherwise, processing loops back to block 408 to continue crawling the selected host site using the selected mobile user agent.

At block 416, the host site is tagged as crawlable by the selected mobile user agent. In one embodiment, the first mobile user agent that is determined to reach the configurable threshold number of mobile viewable documents, may also be identified for the selected host site. Processing then continues to decision block 418, where a determination is made whether there are more mobile user agents to examine against the selected host site. If there are, processing flows to block 426 where the next mobile user agent is obtained. Processing then loops back to block 408 where the host site is then examined using the newly selected mobile user agent. If, however, there are no more mobile user agents to examine for the selected host site, processing flows to decision block 420 where a determination is made whether there are any more host sites to examine. If there are, processing flows to block 424 where the next host site is obtained. Processing then returns to block 408, where each of the mobile user agents are then employed to discover whether the newly selected host site is mobile viewable by any of the mobile user agents. Processing continues through the loops described above, until all of the mobile user agents have been examined against each of the host sites. At this stage, decision block 420 flows to block 422, where a best mobile user agent may be selected for each host site; that is, if any mobile user agent was discovered.

A best mobile user agent may be selected based on a variety of criteria. In one embodiment, a best mobile user agent may be selected based on a combination of a number of documents, pages, or the like, viewable by the mobile user agent, a response time to view the documents, pages, or the like, and a data format or friendliness of the documents for viewing by the mobile user agent. In another embodiment, a best mobile user agent may also be selected based on a subset of the above criteria, or even different criteria. In any event, process 400 then returns to a calling process to perform other actions. The output of process 400 then includes a list of mobile searchable sites, along with a list of those mobile user agents that may be employed to view content at that site. In one embodiment, the output further includes identification of a best mobile user agent for a given site based on specified criteria for 'best.' In another embodiment, the output of process 400 may further include identification of host sites that are not viewable by a given mobile user agent.

It is important to note that while process 400 is illustrated as sequentially progressing through mobile user agents for each host site, and progressing sequentially through each host site, the invention is not so limited. Thus, in one embodiment, a host site may be examined by multiple mobile user agents concurrently. In another embodiment, multiple host sites may also be examined concurrently by multiple mobile user agents. Thus, process 400 merely illustrates one embodiment, and is not intended to limit the invention.

Figure 5:
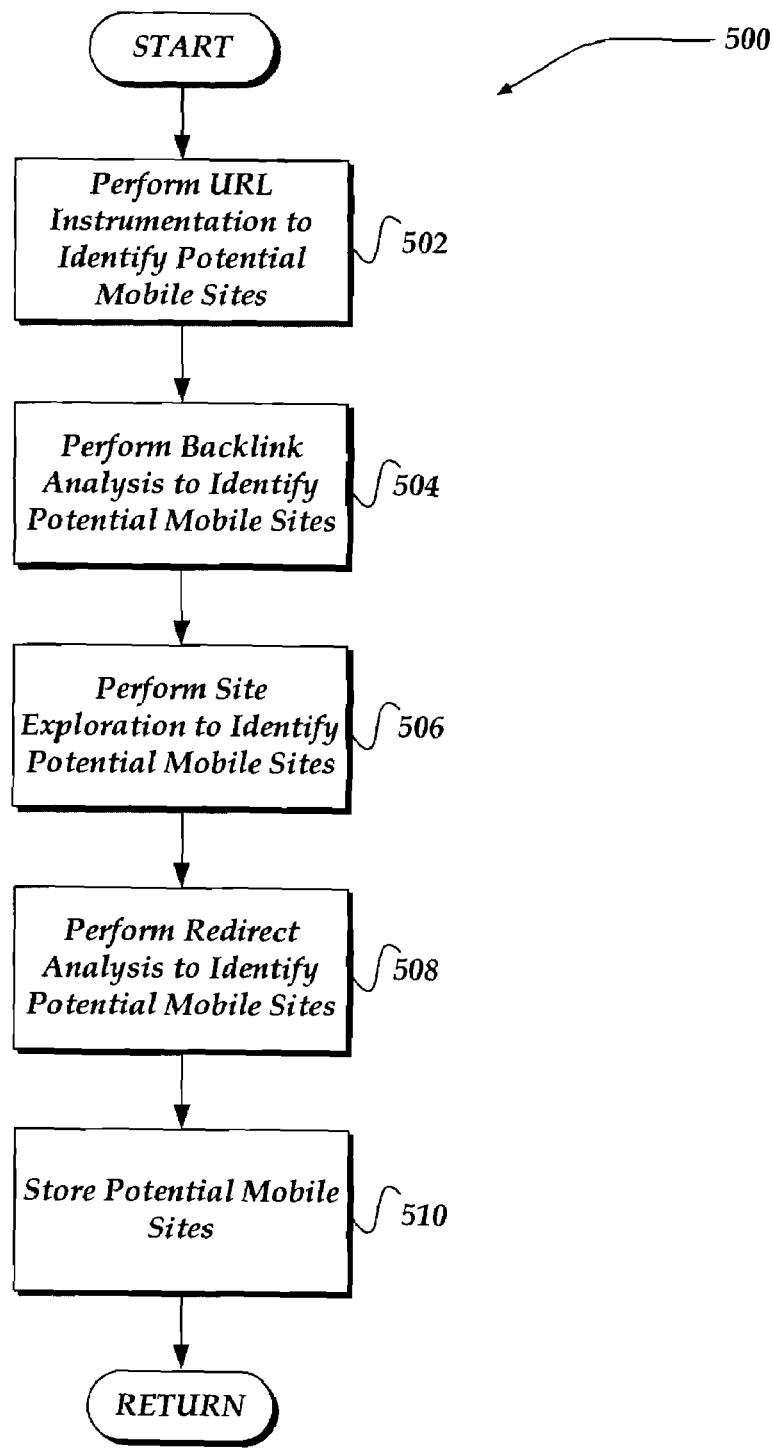
FIG. 5 illustrates a logical flow diagram generally showing one embodiment of an overview process for identifying potential mobile sites, in accordance with various embodiments.

FIG. 5 illustrates a logical flow diagram generally showing one embodiment of an overview process for identifying potential mobile sites. As such, process 500 illustrates various mechanisms for obtaining potential mobile host sites for use automatically discovering mobile searchable host sites. Process 500 may represent one embodiment of block 402 of FIG. 4, for example. Moreover, although process 500 is illustrated as a sequential process, various other embodiments may implement the actions concurrently, or even in a different sequence than illustrated.

However, as shown, process 500 begins, after a start, at block 502, where URL instrumentation is performed to identify potential mobile sites for further discovery analysis. In one embodiment, a known host site is selected. The URL for the host site may then be modified or instrumented with a mobile keyword to generate potential mobile links. For example, in one embodiment, a URL such as www.bbc.co.uk may be instrumented by adding various mobile keywords, such as wap, mobile, \XHTML, or the like, to generate potential mobile sites, such as \wap.bbc.co.uk, or www.bbc.co.uk\mobile, or the like. These instrumented URLs may then be employed to attempt to discover additional potential mobile sites. In one embodiment, a mobile user agent may be selected to attempt to access content from the instrumented URLs. If content is returned from the instrumented URL, it may be analyzed for its mobileness. In this manner, potential mobile host starting sites may be discovered for a know domain, host site, web site, or the like. The successful potential mobile host starting links may then be provided to process 400, for use as described above.

Processing may then flow to block 504, where a backlink analysis may then be performed to further discover potential mobile host sites. A mobile host name may be provided as a query term to a search engine to determine host sites that may link to the provided mobile host name. In one embodiment, all of the returned sites may be recorded. The returned sites may include links to the known mobile host name. Thus, the returned sites may further include additional potential mobile site information. Therefore, the returned sites along with any anchor text information within the returned site pages, number of links within the returned site pages, and the like, may be analyzed for potential additional mobile related pages. These additional links may then be provided to a database such as delivery database 304 of FIG. 3. In this manner, process 504 may identify interlinking between host sites that may be useful for mobile searches, indexing, or the like.

Processing continues to block 506, where site exploration may be performed to further identify potential mobile sites. In block 506, URLs may be obtained for pages crawled by a web crawler for a given host or URL. By querying a search tool for a given host name and analyzing the returned URLs, additional starting points may be obtained. In this manner, rediscovery of already discovered links may be averted, and potential new host sites may also be added. In one embodiment, a mobile keyword analysis may be performed on the returned URLs to discover potential new host sites.

Process 500 continues next to block 508, where redirection analysis may be performed. At block 508, a list of popular sites may be obtained. A site may be deemed to be popular based on a variety of criteria, including for example, based on a traffic flow, a number of recorded hits at the site, or the like. In one embodiment, the list includes sites deemed to be popular up to some threshold number of sites. Access is then attempted to the sites, using one or more selected mobile user agents. If the site redirects the mobile user agent to another site, that site to which the mobile user agent is redirected is recorded. In this manner, additional potential mobile sites are discovered.

Process 500 flows next to block 510 where the identified potential mobile sites may be stored in a data store for use in performing domain discovery for automatically identifying mobile viewable web sites, domains, hosts, and the like. Process 500 returns to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A method of discovering mobile web sites, comprising:
determining a list of host sites for discovery;
determining a plurality of mobile user agents;
crawling the list of host sites using each of the plurality of mobile user agents;
automatically identifying each host site in the list of host sites that is mobile viewable by at least one of the plurality of mobile user agents, wherein if a threshold of documents are retrieved for a host site within the list of host sites and the documents are determined to be mobile viewable by at least one mobile user agent, then identifying the host site as mobile viewable for the at least one mobile user agent;
for each host site that is identified as being mobile viewable by more than one mobile user agent, selecting one of the mobile user agents for the mobile viewable host site as a best mobile user agent based, in part, on a number of documents viewable, a response time to view the documents with a mobile user agent, and a mobileness of the documents; and
providing a list of each mobile viewable host site along with identification of which mobile user agent is useable for each mobile viewable host site in the list, and for each mobile viewable host site viewable by more than one mobile user agent identifying the selected best mobile user agent.

2. The method of claim 1, wherein mobileness of a document is determined based on at least one of a content type of the document, a DTD the document is pointing to, a number of valid tags within the document, a number of negative tags within the document, or a document size.

3. The method of claim 1, wherein crawling the list of host sites further comprises:
if a link within a crawled host site is to another host site not in the list of host sites, adding the host site to the list of host sites.

4. The method of claim 1, wherein the host site is determined to be a mobile viewable site is based on successfully retrieving content using at least one mobile user agent.

5. The method of claim 1, wherein a computer readable storage medium is configured to store program instructions that when installed on a computer enables the computer to perform the method of claim 1.

6. A server that is configured for use in discovering mobile web sites, comprising:

a transceiver for receiving and for sending information over the network; and
program code that is operative to automatically perform actions comprising:
determining a candidate mobile web site for discovery;
crawling the candidate mobile web site;
if a threshold number of mobile viewable content is retrieved from the candidate mobile web site using at least one mobile user agent, designating the candidate mobile web site as mobile viewable for the at least one mobile user agent; and
if the at least one mobile user agent includes more than one mobile user agent for the mobile viewable web site, then selecting one of the mobile user agents as a best mobile user agent for the mobile viewable web site based in part on a number of documents viewable and a response time to view the documents with a mobile user agent; and
providing a list of each mobile viewable host site along with identification of which mobile user agent is useable for each mobile viewable host site in the list, and for each mobile viewable host site viewable by more than one mobile user agent identifying the selected best mobile user agent.

7. The server of claim 6, wherein the automatic actions further comprise:
providing the mobile viewable web site, and identification of the at least one mobile user agent useable for the mobile viewable web site a search crawler for use in indexing mobile viewable web sites.

8. The server of claim 6, wherein the automatic actions further comprise:
if a determined number of attempts to retrieve mobile viewable content is exceeded for a mobile user agent from the-candidate mobile web site before the threshold number of mobile viewable content is retrieved, identifying the candidate mobile web site as uncrawlable by the mobile user agent.

9. The server of claim 6, wherein crawling the candidate mobile web site further comprises:
if a link to another candidate mobile web site is discovered based, in part, on crawling the candidate mobile web site, further determining whether the discovered other candidate mobile web site is to a mobile viewable web site.

10. The server of claim 6, wherein content is determined to be mobile viewable content based, in part, on at least one of the following: a content type of the content, a DTD for which the content is pointing to, a number of valid tags in the content, a number of negative tags in the content, or a content size.

11. The server of claim 6, wherein determining the candidate mobile web site further comprises, determining the candidate mobile web site using at least one of the following:
performing URL instrumentation on at least one site name by modifying the site name using a mobile related keyword, and attempting to access the modified site name using the at least one mobile user agent to determine the candidate mobile web site;
performing a query using a known mobile site, to obtain at least one other site that includes a link to the known mobile site, and then searching the at least one other site for a candidate mobile web site;
selecting at least one site determined to be popular based on a network traffic determination, attempt to access the site name with mobile specific user agent and a mobile header information, and if redirected to a mobile site, employing the mobile site as the candidate mobile web site; or providing candidate mobile sites based on an analysis of keywords for mobile content and URLs of sites crawled by another web crawler.

12. A computer-readable storage medium having computer-executable instructions, the computer-executable instructions when installed onto a computer processor enables the computer processor to automatically perform actions comprising:

determining a plurality of candidate mobile sites for discovery;

crawling each of the plurality of candidate mobile sites;

if a threshold number of mobile viewable content is successfully retrieved from a candidate mobile site in the plurality of candidate mobile sites, using at least one mobile user agent, designating the candidate mobile site as mobile viewable for the at least one mobile user agent; and if the at least one mobile user agent includes more than one mobile user agent for the mobile viewable site, then selecting one of the mobile user agents as a best mobile user agent for the mobile viewable site based in part on a number of documents viewable and a response time to view the documents with a mobile user agent; and providing a list of each mobile viewable host site along with identification of which mobile user agent is useable for each mobile viewable host site in the list, and for each mobile viewable host site viewable by more than one mobile user agent identifying the selected best mobile user agent.

13. The computer-readable storage medium of claim 12, wherein content is determined to be mobile viewable for the at least one mobile user agent, based, in part, on a content type, a DTD the content is pointing to, a number of valid tags within the content, a number of negative tags within the content, or a content size.

14. The computer-readable storage medium of claim 12, wherein selecting one of the mobile user agents as a best mobile user agent is further based, in part, on a mobileness of the documents, wherein mobileness is based in part on at least one of a content type, a DTD the content is pointing to, a number of tags determined as valid for the mobile user agent, a number of tags determined as negative for the mobile user agent, or a content size.

15. The computer-readable storage medium of claim 12, further comprising:

if a determined number of attempts to retrieve mobile viewable content is exceeded for a mobile user agent from a candidate mobile site before the threshold number of mobile viewable content is successfully retrieved, identifying the candidate mobile site as uncrawlable by the mobile user agent.

16. A system for use in discovering mobile web sites, comprising:

a candidate site generator executing on at least one processor that is configured to perform actions to identify a plurality of candidate sites;

a mobile device repository residing within a computer readable storage medium and configured to store a plurality of mobile user agents; and a domain discoverer component executing on at least one processor that is configured to perform actions, comprising:

crawling each of the plurality of candidate sites and attempting to successfully retrieve content using each of the plurality of mobile user agents;

if a threshold number of valid mobile viewable content is successfully retrieved from a candidate site in the plurality of candidate sites, by at least one mobile user agent, designating the candidate site as mobile viewable for the at least one mobile user agent; and if the at least one mobile user agent includes more than one mobile user agent for the mobile viewable site, then selecting one of the mobile user agents as a best mobile user agent for the mobile viewable site based in part on a number of documents viewable and a response time to view the documents; and providing a list of each mobile viewable host site along with identification of which mobile user agent is useable for each mobile viewable host site in the list, and for each mobile viewable host site viewable by more than one mobile user agent identifying the selected best mobile user agent.

17. The system of claim 16, wherein the candidate site generator further comprises at least one of the following:

a URL instrumentation generator that is configured to modify a site name using a mobile related keyword, and attempt to access the modified site name using the at least one mobile user agent to identify at least one candidate site;

a backlink generator that is configured to perform a query using a known mobile web site to obtain at least one site that includes a link to the known mobile web site, and then searching the at least one site for at least one candidate site;

a redirect analysis generator that is configured to select at least one site determined to be popular based on a network traffic determination, attempt to access the site with mobile user agent and mobile specific header information and if redirected to a mobile site, to identify the mobile site as at least one candidate site; or providing candidate mobile sites based on an analysis of keywords for mobile content and URLs of sites crawled by another web crawler.

18. The system of claim 16, wherein the actions of the domain discoverer component further comprise:

if a link to another candidate site is discovered based, in part, on crawling the plurality of candidate sites, adding the discovered other candidate site to the plurality of candidate sites to be crawled and content attempted to be retrieved using each of the plurality of mobile user agents.

19. An apparatus having one or more processors which discovers mobile web sites, comprising:

means for determining a list of candidate host sites for discovery;

a discoverer component useable to automatically identify each host site in the list of candidate host sites that is mobile viewable by at least one of a plurality of mobile user agents by crawling each candidate host site and, in part, attempting to access content on the candidate host site using each of the plurality of mobile user agents, wherein if a threshold of documents are retrieved for a host site within the list of candidate host sites, and the documents are determined to be mobile viewable by at least one mobile user agent, then identifying the host site as mobile viewable for the at least one mobile user agent; and means for providing a list of each mobile viewable host site along with identification of which mobile user agent is useable for each mobile viewable host site, wherein for each mobile viewable host site having more than one mobile user agent identified, means for identifying within the list a best mobile user agent for each mobile viewable host site based in part on a number of documents viewable and a response time to view the documents with a mobile user agent.

* * * * *